US012787055B2

(12) United States Patent
Zhao et al.

(10) Patent No.: US 12,787,055 B2
(45) Date of Patent: Nov. 3, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Nande Zhao, Dongguan (CN); Dongjun Ma, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 298 days.

(21) Appl. No.: 18/616,653

(22) Filed: Mar. 26, 2024

(65) Prior Publication Data

US 2024/0237057 A1 Jul. 11, 2024

Related U.S. Application Data

(63) Continuation of application No. PCT/CN2021/129042, filed on Nov. 5, 2021.

(51) Int. Cl.

| | |
|---|---|
| ***H04W 74/00*** | (2009.01) |
| ***H04W 72/0453*** | (2023.01) |
| ***H04W 72/232*** | (2023.01) |
| ***H04W 74/0808*** | (2024.01) |

(52) U.S. Cl.

CPC ..... *H04W 74/006* (2013.01); *H04W 72/0453* (2013.01); *H04W 72/232* (2023.01); *H04W 74/0808* (2013.01)

(58) Field of Classification Search

None

See application file for complete search history.

(56) References Cited

U.S. PATENT DOCUMENTS

| | | | | |
|---|---|---|---|---|
| 11,737,110 | B2 * | 8/2023 | Wu | H04L 1/1819 370/329 |
| 2022/0159730 | A1 * | 5/2022 | Shin | H04L 1/00 |
| 2022/0183053 | A1 * | 6/2022 | Li | H04W 74/006 |

FOREIGN PATENT DOCUMENTS

| | | | | |
|---|---|---|---|---|
| CA | 3125661 A1 * | 7/2020 | | H04W 72/566 |
| CN | 111867080 A | 10/2020 | | |

(Continued)

OTHER PUBLICATIONS

International Search Report in the international application No. PCT/CN2021/129042, mailed on Jun. 29, 2022. 6 pages with English translation.

(Continued)

*Primary Examiner* — Luna Weissberger

(74) *Attorney, Agent, or Firm* — BAYES PLLC

(57) ABSTRACT

A method for wireless communication includes that: a terminal device receives downlink control information (DCI) sent by a network device; and based on a format of the DCI, the terminal device determines, among a plurality of channel access types, a target channel access type for physical uplink channel transmission in a high frequency band, where the plurality of channel access types include at least one of: uplink channel access without listen before talk (LBT); uplink channel access with a short LBT; or uplink channel access with a conventional LBT. A terminal device and a network device are also provided.

17 Claims, 8 Drawing Sheets

(56) References Cited

FOREIGN PATENT DOCUMENTS

| | | |
|---|---|---|
| CN | 112913316 A | 6/2021 |
| WO | 2021066548 A1 | 4/2021 |

OTHER PUBLICATIONS

Written Opinion of the International Search Authority in the international application No. PCT/CN2021/129042, mailed on Jun. 29, 2022. 8 pages with English translation.
3GPP TSG RAN WG1 Meeting #99 R1-1913517, Reno, US, Nov. 18-22, 2019, Agenda item: 7.2.2.2.1, Source: Nokia, Nokia Shanghai Bell, Title: Feature Lead's Summary #2 on Channel Access Procedures, Document for: Discussion and Decision. section 3. 28 pages.
3GPP TSG RAN WG1 #106bis-e R1-2109967, e-Meeting, Oct. 11-19, 2021, Agenda Item: 8.2.6, Source: LG Electronics, Title: Considerations on channel access mechanism to support NR above 52.6 GHZ, Document for: Discussion and decision. section 3.1-3.5. 17 pages.
3GPP TSG RAN WG1 Meeting #106-bis-e R1-2109603, e-Meeting, Oct. 11-19, 2021, Source: Intel Corporation, Title: Discussion on Channel Access Mechanism for extending NR up to 71 GHZ, Agenda item: 8.2.6, Document for: Discussion/Decision. section 10.3-11.1. 24 pages.
3GPP TSG RAN WG1 #106bis-e R1-2109447, e-Meeting, Oct. 11-19, 2021, Agenda item: 8.2.6, Source Nokia, Nokia Shanghai Bell, Title: Channel access mechanism, Document for: Discussion and Decision. section 16.5-16.7. 23 pages.
3GPP TSG RAN WG1 Meeting #106bis-e R1-2108772, e-Meeting, Oct. 11-19, 2021, Agenda Item: 8.2.6, Source: Huawei, HiSilicon, Title: Channel access mechanism for 60 GHz unlicensed operation, Document for: Discussion and Decision. section 18.1-18.5. 30 pages.
First Office Action of the Indian application No. 202417022265, issued on Jun. 17, 2026.

* cited by examiner

100

WIRELESS COMMUNICATION METHOD, TERMINAL DEVICE, AND NETWORK DEVICE

CROSS-REFERENCE TO RELATED APPLICATION

This application is a continuation of International Application No. PCT/CN2021/129042, entitled "WIRELESS COMMUNICATION METHOD, TERMINAL DEVICE, AND NETWORK DEVICE", filed on Nov. 5, 2021, the content of which is hereby incorporated by reference in its entirety.

TECHNICAL FIELD

Embodiments of the present disclosure relate to the technical field of communications, in particular to a method for wireless communication, a terminal device and a network device.

BACKGROUND

In order to allow various communication systems that use an unlicensed spectrum for wireless communication to coexist amicably on this spectrum, some countries or regions have stipulated regulatory requirements that must be met when using the unlicensed spectrum. For example, a communication device follows Listen Before Talk (LBT) principle, that is, before the communication device transmits a signal on a channel in unlicensed spectrum, it needs to listen to the channel first, and only when a result of channel listening is that the channel is idle, the communication device can transmit the signal. If the result of the channel listening of the communication device on the channel in the unlicensed spectrum is that the channel is busy, the communication device cannot transmit the signal.

In the unlicensed spectrum, support for high-frequency bands is considered. In this case, how the network device indicates a channel access mode of a physical uplink channel in the high-frequency band is an urgent problem to be solved.

SUMMARY

The present disclosure provides a method for wireless communication, a terminal device, and a network device. The network device can indicate a target channel access type for physical uplink channel transmission in the high-frequency band through a DCI format.

In the first aspect, a method for wireless communication is provided. The method includes the following operations. The terminal device receives downlink control information (DCI) transmitted by a network device. The terminal device determines a target channel access type for physical uplink channel transmission in a high-frequency band among multiple channel access types based on a format of the DCI. The multiple channel access types include at least one of the following: uplink channel access without LBT; uplink channel access with short LBT; or uplink channel access with conventional LBT.

In the second aspect, a method for wireless communication is provided. The method includes the following operation. A network device transmits DCI to a terminal device. The DCI includes a target bit field for determining a target channel access type for physical uplink channel transmission in a high-frequency band.

In the third aspect, a terminal device is provided. The terminal device includes a processor and a memory. The memory is configured to store a computer program, and the processor is configured to invoke and run the computer program stored in the memory to perform the method in the above first aspect or various implementations thereof.

In the fourth aspect, a network device is provided. The network device includes a processor and a memory. The memory is configured to store a computer program, and the processor is configured to invoke and run the computer program stored in the memory to perform the method in the above second aspect or various implementations thereof.

Based on the above technical solutions, the terminal device can determine the target channel access type for the physical uplink channel transmission in the high-frequency band based on the DCI format transmitted by the network device, and further the terminal device can perform channel listening based on the target channel access type to transmit the physical uplink channel.

DETAILED DESCRIPTION

Figure 1:
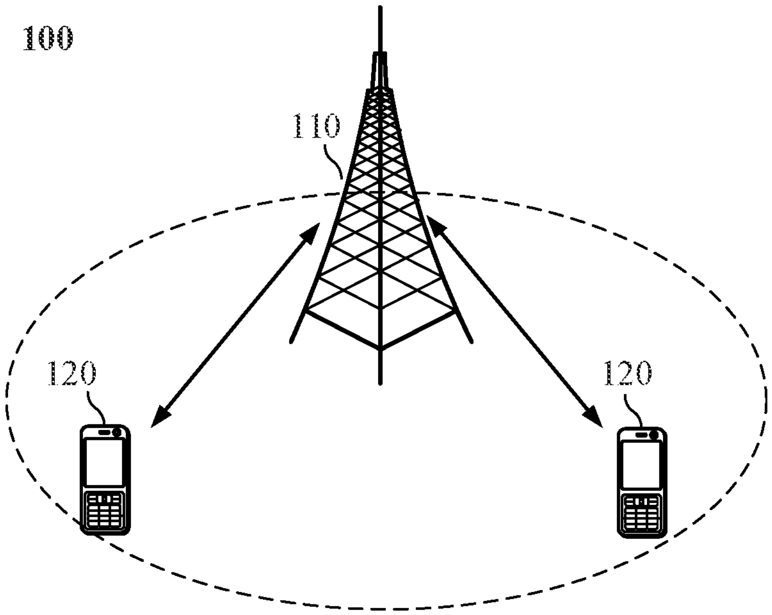
FIG. 1 is a schematic diagram of an architecture of a communication system provided by an embodiment of the present disclosure.

The technical solutions of the embodiments of the present disclosure will be described below in combination with the drawings in the embodiments of the present disclosure, and it is apparent that the described embodiments are part of the embodiments of the present disclosure, but not all of them. With respect to the embodiments in the present disclosure, all other embodiments obtained by those of ordinary skill in the art without making creative efforts fall within the scope of protection of the present disclosure.

The technical solutions of the embodiments of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced long term evolution (LTE-A) system, a New Radio (NR) system, an evolution system of the NR system, a LTE-based access to unlicensed spectrum (LTE-U) system, a NR-based access to unlicensed spectrum (NR-U) system, a Non-Terrestrial Networks (NTN) system, a Universal Mobile Telecommunication System (UMTS), Wireless Local Area Networks (WLAN), a Wireless Fidelity (WiFi), a 5th-Generation (5G) system or other communication systems.

In general, traditional communication systems support a limited number of connections and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc. Embodiments of the present disclosure may also be applied to these communication systems.

Alternatively, the communication system in the embodiments of the present disclosure may be applied to a Carrier Aggregation (CA) scenario, a Dual Connectivity (DC) scenario, or a Standalone (SA) network distribution scenario.

Alternatively, the communication system in the embodiments of the present disclosure may be applied to an unlicensed spectrum. The unlicensed spectrum may also be considered a shared spectrum. Alternatively, the communication system in the embodiments of the present disclosure may also be applied to a licensed spectrum. The licensed spectrum may also be considered as a non-shared spectrum.

The embodiments of the present disclosure are described in combination with a network device and a terminal device. The terminal device may also be referred to as a User Equipment (UE), an access terminal, a subscriber unit, a subscriber station, a mobile station, a mobile stage, a remote station, a remote terminal, a mobile device, a user terminal, a terminal, a wireless communication device, a user agent or a user device, etc.

The terminal device may be a Station (ST) in a WLAN, a cellular telephone, a cordless telephone, a Session Initiation Protocol (SIP) telephone, a Wireless Local Loop (WLL) STATION, a Personal Digital Assistant (PDA) device, a handheld device having a wireless communication function, a computing device or other processing devices connected to a wireless modem, a vehicle-mounted device, a wearable device, a terminal device in a next generation communication system such as an NR network, or a terminal device in a future evolved Public Land Mobile Network (PLMN) network, etc.

In the embodiments of the present disclosure, the terminal device may be deployed on land, which includes an indoor or outdoor device, a hand-held device, a wearable device or a vehicle-mounted device. It may also be deployed on the water (such as a ship, etc.). It may also be deployed in the air (such as an airplane, a balloon and a satellite, etc.).

In the embodiments of the present disclosure, the terminal device may be a Mobile Phone, a tablet computer (Pad), a computer with the wireless transceiver function, a Virtual Reality (VR) terminal device, an Augmented Reality (AR) terminal device, a wireless terminal device in the industrial control, a wireless terminal device in the self-driving, a wireless terminal device in the remote medical, a wireless terminal device in the smart grid, a wireless terminal device in the transportation safety, a wireless terminal device in the smart city, or a wireless terminal device in the smart home, etc.

By way of example and not limitation, in embodiments of the present disclosure, the terminal device may also be a wearable device. The wearable device may also be referred to as a wearable smart device, which is the general name of wearable devices developed by applying wearable technology to intelligently design daily wear, such as glasses, gloves, watches, clothing and shoes. The wearable device is a portable device that is worn directly on the body or integrated into the clothes or accessories of the user. The wearable device is not only a kind of hardware device, but also realizes powerful functions through software support, data interaction and cloud interaction. Generalized wearable smart devices have characteristics of full functions, large size and realizing complete or partial functions without relying on smart phones, such as a smart watch or smart glasses, and a device that only focuses on certain application functions and needs to be used in combination with other devices, such as smart phones, for example, various smart bracelets for listening physical signs and smart jewelries.

In the embodiment of the present disclosure, the network device may be a device for communicating with a mobile device, and the network device may be an Access Point (AP) in the WLAN, a Base Transceiver Station (BTS) in a GSM or CDMA, a NodeB (NB) in a WCDMA, an Evolutional Node B (eNB or eNodeB) in a LTE, a relay station or an AP, a vehicle-mounted device, a wearable device, a network device (gNB) in a NR network, a network device in a future evolved PLMN network or a network device in an NTN network, etc.

By way of example and not limitation, in the embodiments of the present disclosure, the network device may have mobility characteristics, for example, the network device may be a mobile device. Alternatively, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, and the like. Alternatively, the network device may also be a base station arranged on land, water and the like.

In the embodiments of the present disclosure, the network device may provide services for a cell, and the terminal device communicates with the network device through transmission resources (for example, frequency domain resources, or spectrum resources) used by the cell. The cell may be a cell corresponding to the network device (for example, a base station), and the cell may belong to a macro base station or a base station corresponding to a Small cell. The Small cell may include a Metro cell, a Micro cell, a Pico cell, a Femto cell, etc. These Small cells have the characteristics of the small coverage area and the low transmission power, and are suitable for providing high-rate data transmission services.

Exemplarily, the communication system 100 to which the embodiments of the present disclosure are applied is illustrated in FIG. 1. The communication system 100 may include a network device 110. The network device 110 may be a device that communicates with a terminal device 120 (or referred to as a communication terminal or a terminal). The network device 110 may provide communication coverage for a particular geographic area and may communicate with terminal devices located within the coverage area.

FIG. 1 exemplarily illustrates one network device and two terminal devices. Alternatively, the communication system 100 may include multiple network devices and other numbers of terminal devices may be included within the coverage area of each network device, which is not limited by embodiments of the present disclosure.

Alternatively, the communication system 100 may further include other network entities, such as network controllers, mobility management entities and the like, which are not limited by the embodiments of the present disclosure.

It should be understood that a device having a communication function in a network/system in the embodiments of the present disclosure may be referred to as a communication device. Taking the communication system 100 illustrated in FIG. 1 as an example, the communication device may include a network device 110 and a terminal device 120 that have communication functions, and the network device 110 and the terminal device 120 may be specific devices described above, which will not be repeated here. The communication device may further include other devices in the communication system 100, such as, network controllers, mobility management entities and other network entities, which are not limited in the embodiments of the present disclosure.

It should be understood that the terms "system" and "network" are often used interchangeably in the present disclosure. In the present disclosure, the term "and/or" is merely used for describing an association relationship of associated objects, which indicates that there may be three relationships. For example, A and/or B may represent that there are three situations: A exists alone, A and B exist simultaneously, or B exists alone. In addition, the character "/" in the present disclosure generally indicates that there is a "or" relationship between the associated objects.

It should be understood that the reference to "indicating" in the embodiments of the present disclosure may be a direct indication, may be an indirect indication, or may be an indication of an association relationship. For example, A indicates B, which may represent that A directly indicates B, for example, B may be obtained through A, may represent that A indirectly indicates B, for example, A indicates C, and B may be obtained through C, or may represent that there is an association relationship between A and B.

In the description of the embodiments of the present disclosure, the term "corresponding" may represent that there is a direct correspondence relationship or an indirect correspondence relationship between the two objects, may represent that there is an association relationship between the two objects, or may represent a relationship between indication and being indicated, configuration and being configured, etc.

In the embodiments of the present disclosure, the "predefined" may be achieved by pre-storing corresponding codes, tables or other means that may be used to indicate relevant information in devices (for example, including the terminal device and the network device), and the present disclosure is not limited to the specific implementation thereof. For example, the "predefined" may refer to what is defined in the protocol.

In the embodiments of the present disclosure, the "protocol" may refer to a standard protocol in the communication field, for example, may include an LTE protocol, an NR protocol, and related protocols applied in future communication systems, which are not limited in the present disclosure.

In order to facilitate understanding of the technical solutions of the embodiments of the present disclosure, the channel access types related to the present disclosure are described.

In an NR-U system, when a terminal device is scheduled to perform a Physical Uplink Shared Channel (PUSCH) transmission or a Physical Uplink Control Channel (PUCCH) transmission, a base station may indicate a channel access mode corresponding to the PUSCH or PUCCH through Downlink Control Information (DCI) carrying an uplink grant or a downlink grant.

For example, the base station may explicitly indicate a channel access parameter, such as a Cyclic Prefix Extension (CPE) length, a channel access type and a Channel Access Priority Class (CAPC) to the terminal device through joint coding.

Next, the indication manners of the channel access parameters introduced under different DCI formats are introduced.

The DCI Format 0_0 is a DCI format corresponding to the fallback uplink grant for scheduling PUSCH transmission. In a cell accessed to the shared spectral channel, the channel access and CPE (i.e., ChannelAccess-CPext) information of 2 bits is carried, and the channel access type and CPE information are indicated in the manner illustrated in Table 1.

TABLE 1

Channel Access Type & CP extension for DCI Format 0_0 and DCI Format 1_0

| Index to which a bit field is mapped | Channel access type | CPE type |
|---|---|---|
| 0 | Type2C-uplink channel access | 2 |
| 1 | Type2A-uplink channel access | 3 |
| 2 | Type2A-uplink channel access | 1 |
| 3 | Type1-uplink channel access | 0 |

The DCI Format 1_0 is a DCI format corresponding to the fallback downlink grant for scheduling the PDSCH transmission. In a cell accessed to the shared spectrum channel, the ChannelAccess-CPext information of 2 bits is carried, and the channel access type and CPE information are indicated in the manner illustrated in Table 1. The channel access mode and the CPE length are used for the PUCCH transmission carrying the Hybrid Automatic Repeat request Acknowledgement (HARQ-ACK).

The DCI Format 0_1 is a DCI format corresponding to the non-fallback uplink grant for scheduling the PUSCH transmission. In a cell accessed to the shared spectrum channel, the ChannelAccess-CPext-CAPC information of 0-6 bits is carried, and the bit width of bit field is $\log_2 I$ bits, where I represents the allowed entry indexes for DCI Format 0_1 configured by the higher layer parameter. For example, the channel access type, the CPE information and the CAPC information may be indicated in the manner illustrated in table 2.

TABLE 2

Allowed entry indexes for DCI Format 0_1 configured by higher layer parameter

| Entry index | Channel access type | CPE type | CAPC |
|---|---|---|---|
| 0 | Type2C-uplink channel access | 0 | 1 |
| ... | ... | ... | ... |
| 7 | Type2C-uplink channel access | 2 | 4 |
| 8 | Type2B-uplink channel access | 0 | 1 |
| ... | ... | ... | ... |
| 15 | Type2B-uplink channel access | 2 | 4 |
| 16 | Type2A-uplink channel access | 0 | 1 |
| ... | ... | ... | ... |
| 27 | Type2A-uplink channel access | 3 | 4 |
| 28 | Type1-uplink channel access | 0 | 1 |
| ... | ... | ... | ... |
| 43 | Type1-uplink channel access | 3 | 4 |

The DCI Format 1_1 is a DCI format corresponding to the non-fallback uplink grant for scheduling the PDSCH transmission. In a cell accessed to the shared spectrum channel, the ChannelAccess-CPext information of 0-4 bits is carried, and the bit width of the bit field is $\log_2 I$ bits, where I represents allowed entry indexes for the DCI Format 1_1 configured by the higher layer parameter. The channel access mode and the CPE length are used for the PUCCH transmission carrying the HARQ-ACK. For example, the channel access type and the CPE information may be indicated in the manner illustrated in table 3.

TABLE 3

| Allowed entry indexes for DCI Format 1_1 configured by higher layer parameter | | |
|---|---|---|
| Entry index | Channel access type | CPE type |
| 0 | Type2C-uplink channel access | 0 |
| 1 | Type2C-uplink channel access | 2 |
| 2 | Type2B-uplink channel access | 0 |
| 3 | Type2B-uplink channel access | 2 |
| 4 | Type2A-uplink channel access | 0 |
| 5 | Type2A-uplink channel access | 1 |
| 6 | Type2A-uplink channel access | 3 |
| 7 | Type1-uplink channel access | 0 |
| 8 | Type1-uplink channel access | 1 |
| 9 | Type1-uplink channel access | 2 |

Thus, when the DCI indicates the channel access mode corresponding to the PUSCH or the PUCCH, the index to which the bit field is mapped is associated with the channel access type, CPE information and CAPC information. Because the concepts of CPE and CAPC are not introduced in the unlicensed high-frequency band, and the channel access type supported by the high-frequency band not completely corresponds to the channel access type supported by the non-high-frequency band, how to indicate the channel access types in the high-frequency band is an urgent problem to be solved.

In order to facilitate understanding of the technical solutions of the embodiments of the present disclosure, the technical solutions of the present disclosure will be described in detail below by way of specific embodiments. The above related technology may be taken an alternative solution to be arbitrarily combined with the technical solutions of the embodiments of the present disclosure, and all of them belong to the protection scope of the embodiments of the present disclosure. The embodiments of the present disclosure include at least part of the following contents.

Figure 2:
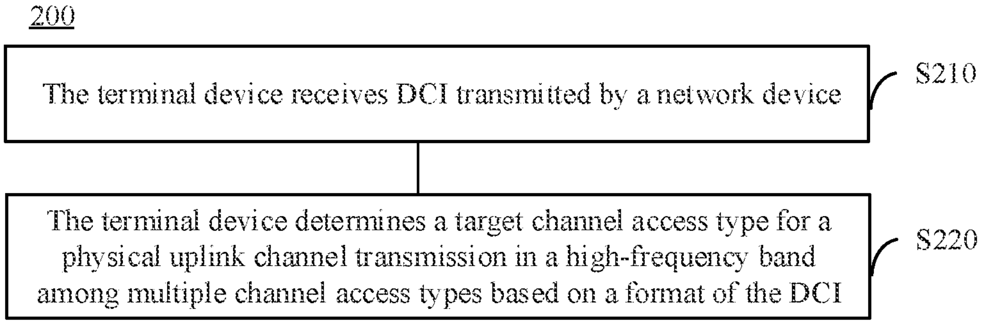
FIG. 2 is a schematic flowchart of a method for wireless communication provided by an embodiment of the present disclosure.

FIG. 2 is a schematic flowchart of a method 200 for wireless communication based on an embodiment of the present disclosure. The method 200 may be executed by a terminal device in the communication system illustrated in FIG. 1. As illustrated in FIG. 2, the method 200 includes the following operations.

In S210, the terminal device receives downlink control information (DCI) transmitted by a network device.

In S220, the terminal device determines a target channel access type for a physical uplink channel transmission in a high-frequency band among multiple channel access types based on a format of the DCI.

It should be understood that in the embodiments of the present disclosure, the multiple channel access modes may be the channel access types supported by the high-frequency band, for example, which may include the channel access types already supported by the high-frequency band, or may also include channel access types newly added for the high-frequency band in the evolution of the standard, or changed channel access types for the high-frequency band, etc., which are not limited in the present disclosure.

In some embodiments of the present disclosure, the multiple channel access types include, but are not limited to, at least one of: an uplink channel access without LBT, an uplink channel access with short LBT, or an uplink channel access with conventional LBT.

It should be understood that the channel access type in the embodiments of the present disclosure may be referred to as the channel access mode.

In some embodiments, the high-frequency band may be an unlicensed high-frequency band. The unlicensed high-frequency band may be referred to as a license-free high-frequency band.

It should be understood that in the embodiments of the present disclosure, the high-frequency band may also be replaced by a high-frequency spectrum, for example, the high-frequency spectrum may be an unlicensed high-frequency spectrum, or a shared high-frequency spectrum, or a license-free high-frequency spectrum, etc.

In some embodiments of the present disclosure, for uplink channel access without LBT, the terminal device may perform the channel access without performing LBT. In this case, the channel detection time may be considered to be zero. For the uplink channel access with short LBT, the terminal device needs to perform the channel detection for a short time for the channel access. For the uplink channel access with conventional LBT, the terminal device needs to perform the channel detection for a slightly longer time for channel access. That is, the channel detection time corresponding to the uplink channel access with the short LBT is shorter than the channel detection time corresponding to the uplink channel access with the conventional LBT.

It should be understood that the above channel access types are only examples, and the channel access type for the high-frequency band may also include more channel access types, for example, may also include an uplink channel access with long LBT. The channel detection time corresponding to the uplink channel access with long LBT is greater than the channel detection time corresponding to the uplink channel access with conventional LBT.

In some embodiments of the present disclosure, the physical uplink channel may include, but is not limited to, a PUSCH or a PUCCH.

In some embodiments, the uplink channel access without LBT may include, but is not limited to, an uplink channel access with Type2C LBT.

In some embodiments, the uplink channel access with the short LBT may include, but is not limited to, an uplink channel access with Cat 2 LBT, an uplink channel access with Type2B LBT, or an uplink channel access with Type2A LBT.

In some embodiments, the uplink channel access with the conventional LBT may include, but is not limited to, an uplink channel access with Cat 4 LBT, or an uplink channel access with Type1 LBT.

In some embodiments, for the uplink channel access with conventional LBT, the channel access is performed using a channel access procedure with conventional LBT. For example, for the uplink channel access with Cat 4 LBT in the high-frequency band, the channel detection time consists of N LBT listening slots immediately following $T_d$=8 μs and $T_d$=8 μs. Each LBT listening slot $T_{sl}$=5 μs. That is, for the uplink channel access with Cat 4 LBT in the high-frequency band, the channel detection time $T=T_d+N*T_{sl}$·N is the random backoff number generated based on the size of the contention window.

In some embodiments, for the uplink channel access with short LBT, the channel access is performed using the channel access procedure with short LBT. For example, for the uplink channel access with the Cat 2 LBT in the high-frequency band, the channel detection time T=8 μs.

In some embodiments of the present disclosure, the DCI explicitly indicates the target channel access type for the physical uplink channel transmission in the high-frequency band.

For example, the DCI includes first indication information, and the first indication information indicates the target channel access type corresponding to the physical uplink channel transmission in the high-frequency band.

In some embodiments, the terminal device interprets the first indication information based on the DCI format to determine the target channel access type corresponding to the physical uplink channel scheduled by the DCI format.

In other embodiments, the formats of the DCI are not distinguished. When the target channel access type for the physical uplink channel transmission in the high-frequency band is determined based on the first indication information, the first indication information is interpreted in the same manner.

In some embodiments of the present disclosure, for DCI in a target DCI format, the DCI includes the first indication information.

Alternatively, the target DCI format includes at least one of: DCI Format 0_0, DCI Format 1_0, DCI Format 0_1, or DCI Format 1_1.

In some embodiments of the present disclosure, the first indication information is included in a target bit field in the DCI. The first indication information may occupy a part of bits or all bits of the target bit field.

It should be understood that the target bit field may be an existing bit field in the DCI, or may be a newly added bit field. That is, a dedicated bit field may be added to indicate the target channel access type for the physical uplink channel transmission in the high-frequency band.

In other words, an existing bit field in the DCI may be reused to indicate the target channel access type for the physical uplink channel transmission in the high-frequency band, or the target channel access type for the physical uplink channel transmission in the high-frequency band may be indicated in a newly added bit field in the DCI.

In some embodiments, when the existing bit field is used to indicate the target channel access type for the physical uplink channel transmission in the high-frequency band, a manner in which the existing bit field is interpreted to indicate the target channel access type for the physical uplink channel transmission in the high-frequency band may further be defined.

In some embodiments, a bit field in the DCI for indicating information related to channel access, for example, a bit field used for carrying ChannelAccess-CPext information, or ChannelAccess-CPext-CAPC information, may be reused to indicate the target channel access type for the physical uplink channel transmission in the high-frequency band.

It should be understood that the bit width of the target bit field is not limited in the embodiments of the present disclosure. For example, it may be determined based on the number of channel access types indicated as needed or based on the number of the multiple channel access types. For example, for the uplink channel access without LBT, the uplink channel access with short LBT and the uplink channel access with conventional LBT supported by the high-frequency band, the bit width of the target bit field may be 2 bits.

In some embodiments, when the format of the DCI is the target DCI format, the terminal device determines the target channel access type for the physical uplink channel transmission in the high-frequency band based on the target bit field in the DCI.

In some implementations, the terminal device may determine the target channel access type for the physical uplink channel transmission in the high-frequency band among the multiple channel access types based on the target bit field in the DCI and a target correspondence. The target correspondence indicates a correspondence between an index to which the target bit field is mapped and a channel access type.

Alternatively, the index to which the target bit field is mapped may be a value of the target bit field, or an index corresponding to the value of the target bit field.

For example, if the target bit field is 2 bits and the values may be 00~11, the indexes to which the target bit field is mapped may be 0~3. For example, the index to which the value 00 of the target bit field is mapped is 0, the index to which the value 01 of the target bit field is mapped is 1, the index to which the value 10 of the target bit field is mapped is 2, and the index to which the value 11 of the target bit field is mapped is 3. Alternatively, the indexes to which the target bit field is mapped may be 1~4. For example, the index to which the value 00 of the target bit field is mapped is 1, the index to which the value 01 of the target bit field is mapped is 2, the index to which the value 10 of the target bit field is mapped is 3, and the index to which the value 11 of the target bit field is mapped is 4, which is not limited in the present disclosure.

It should be understood that in the embodiments of the present disclosure, the target correspondence may be in the form of a table, a tree, a linked list, etc. The characterization of the target correspondence is not limited in the present disclosure. Hereinafter, the target correspondence in the form of the table is taken as an example, but the present disclosure is not limited thereto.

In some implementations, the target correspondence is dedicated to indicating a correspondence between the index to which the target bit field is mapped and the channel access type in the high-frequency band. For example, a table may be newly added to indicate a correspondence between the index to which the target bit field is mapped and the channel access type in the high-frequency band. That is, the table is a dedicated table for determining the correspondence between the index to which the target bit field is mapped and the channel access type for the physical uplink channel in the high-frequency band.

It should be understood that in the embodiments of the present disclosure, different DCI formats may correspond to the same target correspondence. For example, the terminal device may maintain the same table for different DCI formats. Alternatively, different DCI formats may correspond to different target correspondences. For example, the terminal device may maintain a respective table for each DCI format for different DCI formats.

In other implementations, the target correspondence reuses a correspondence between an index to which a bit field is mapped and a channel access type in the non-high-frequency band.

For example, the correspondence between the index to which the bit field is mapped and the channel access type in the non-high-frequency band is the first table. For the first table, both the channel access type corresponding to the index to which the bit field is mapped in the non-high-frequency band and the channel access type corresponding to the index to which the bit field is mapped in the high-frequency band can be defined.

For another example, the correspondence between the index to which the bit field is mapped and the channel access type in the non-high-frequency band is the first table. For the first table, both the channel access type corresponding to the index to which the bit field is mapped in the non-high-frequency band and the correspondence (or a replacement relationship) between the channel access type in the high-frequency band and the channel access type in the non-high-frequency band can be defined.

The terminal device may determine the corresponding channel access type in the non-high-frequency band based on the index to which the bit field is mapped and the first table, and further determine the channel access type in the high-frequency band according to the correspondence between the channel access type in the high-frequency band and the channel access type in the non-high-frequency band.

It should be understood that the above implementation of the target correspondence is by way of example only, but the present disclosure is not limited thereto, and other implementations derived from the exemplary variations or reasonable reasoning of the present disclosure fall within the scope of protection of the present disclosure.

An indication manner of the target channel access type for the physical uplink channel transmission in the high-frequency band is described below in combination with specific DCI formats.

Embodiment 1: DCI Format 0_0

Firstly, an implementation of a target bit field in DCI format 0_0 is explained.

For the DCI format 0_0, the target bit field may be a newly added bit field. That is, a dedicated bit field for indicating a target channel access type for PUSCH transmission in the high-frequency band is newly added.

For the DCI format 0_0, the target bit field may reuse an existing bit field. For example, the first bit field in the DCI is reused to indicate the target channel access type for the PUSCH transmission in the high-frequency band.

For example, the first bit field indicates the channel access type and CPE (ChannelAccess-CPext) information. That is, the first bit field is used for carrying the ChannelAccess-CPext information.

In other words, the ChannelAccess-CPext information in the DCI may be reused to indicate the target channel access type for the physical uplink channel transmission in the high-frequency band. For example, in the unlicensed high-frequency band, the ChannelAccess-CPext information in the DCI is interpreted to indicate the target channel access type for the PUSCH transmission in the high-frequency band.

In some embodiments, the bit width of the first bit field may be 2 bits.

Hereinafter, the implementation of the target correspondence in the DCI Format 0_0 will be explained.

It should be understood that without contradiction, the target correspondence may be combined with any above implementation of the target bit field, and the present disclosure is not limited thereto.

For the DCI Format 0_0, the target correspondence may be a newly added correspondence, such as a newly added table.

Table 4 illustrates an example of a correspondence between an index to which the target bit field is mapped and a channel access type in the high-frequency band.

Therefore, the network device may indicate the channel access mode for the PUSCH transmission to the terminal device through the DCI Format 0_0 and the correspondence illustrated in Table 4.

TABLE 4

| Channel access types for DCI Format 0_0 in the high-frequency band | |
|---|---|
| Index to which a target bit field is mapped | Channel access type |
| 0 | Uplink channel access without LBT |
| 1 | Uplink channel access with short LBT |
| 2 | Uplink channel access with conventional LBT |
| 3 | |

For the DCI Format 0_0, the target correspondence may reuse the first correspondence (for example, the above Table 1). The first correspondence indicates the channel access type and CPE information corresponding to the index to which the bit field is mapped. In this case, the first correspondence indicates both the channel access type corresponding to the index to which the bit field is mapped in the non-high-frequency band and the channel access type corresponding to the index to which the target bit field is mapped in the high-frequency band.

In some implementations, the first correspondence is interpreted to indicate the channel access type corresponding to the index to which the target bit field is mapped in the high-frequency band.

In some embodiments, a correspondence between the channel access type in the non-high-frequency band and the channel access type in the high-frequency band in the first correspondence may be defined. For example, in the high-frequency band, the uplink channel access with Type2C corresponds to the uplink channel access without LBT, the uplink channel access with Type2A corresponds to the uplink channel access with short LBT, and the uplink channel access with Type1 corresponds to the uplink channel access with conventional LBT.

The terminal device determines the channel access type in the high-frequency band based on the channel access type in the non-high-frequency band determined according to the first correspondence, and the correspondence between the channel access type in the non-high-frequency band and the channel access type in the high-frequency band.

In other implementations, the indication manner of the channel access type and the CPE information in the first correspondence is reused.

For example, for the high-frequency band, when the bit field is mapped to the index 0, the target channel access type for the PUSCH transmission of the terminal device is the uplink channel access without LBT. When the bit field is mapped to the indexes 1 and 2, the target channel access type for the PUSCH transmission of the terminal device is the uplink channel access with short LBT. When the bit field is mapped to the index 3, the target channel access type for the PUSCH transmission of the terminal device is the uplink channel access with conventional LBT.

It should be understood that in the embodiments of the present disclosure, when a corresponding channel access type in the non-high-frequency band is determined according to the first correspondence, the index to which the bit field is mapped may be determined based on the above first bit field, for example, based on ChannelAccess-CPext information. When a corresponding channel access type in the high-frequency band is determined according to the first correspondence, the index to which the target bit field is mapped may be determined based on the above first bit field, or may be determined based on a newly added dedicated bit field.

Embodiment 2: DCI Format 1_0

Firstly, an implementation of a target bit field in DCI Format 1_0 is explained.

For the DCI Format 1_0, the target bit field may be a newly added bit field. That is, a dedicated bit field for indicating a target channel access type for PUCCH transmission in the high-frequency band is newly added.

For the DCI Format 1_0, the target bit field may reuse an existing bit field. For example, the second bit field in the DCI is reused to indicate the target channel access type for the PUCCH transmission in the high-frequency band.

For example, the second bit field indicates ChannelAccess-CPext information. That is, the second bit field is used for carrying the ChannelAccess-CPext information.

In other words, the ChannelAccess-CPext information in the DCI may be reused to indicate the target channel access type for the PUCCH transmission in the high-frequency band. For example, in the unlicensed high-frequency band, the ChannelAccess-CPext information in the DCI is interpreted to indicate the target channel access type for the PUCCH transmission in the high-frequency band.

In some embodiments, the second bit field is 2 bits.

Hereinafter, an implementation of the target correspondence in the DCI Format 1_0 will be explained.

It should be understood that without contradiction, the target correspondence may be combined with any above implementation of the target bit field, and the present disclosure is not limited thereto.

For the DCI Format 1_0, the target correspondence may be a newly added correspondence, such as a newly added table.

Table 5 illustrates an example of a correspondence between an index to which the target bit field is mapped and a channel access type in the high-frequency band.

Therefore, the network device may indicate the channel access mode for the PUCCH transmission to the terminal device through the DCI Format 1_0 and the correspondence illustrated in Table 5.

TABLE 5

| Channel access types for DCI Format 1_0 in the high-frequency band | |
|---|---|
| Index to which the target bit field is mapped | Channel access type |
| 0 | Uplink channel access without LBT |
| 1 | Uplink channel access with short LBT |
| 2 | Uplink channel access with conventional LBT |
| 3 | |

For the DCI Format 1_0, the target correspondence may reuse the second correspondence (for example, the above Table 1). The second correspondence indicates the channel access type and CPE information corresponding to the index to which the bit field is mapped. In this case, the second correspondence indicates both the channel access type corresponding to the index to which the bit field is mapped in the non-high-frequency band and the channel access type corresponding to the index to which the target bit field is mapped in the high-frequency band.

In some implementations, the second correspondence is interpreted to indicate the channel access type corresponding to the index to which the target bit field is mapped in the high-frequency band.

In some embodiments, a correspondence between the channel access type in the non-high-frequency band and the channel access type in the high-frequency band in the second correspondence may be defined. For example, the uplink channel access with Type2C corresponds to the uplink channel access without LBT, the uplink channel access with Type2A corresponds to the uplink channel access with short LBT, and the uplink channel access with Type1 corresponds to the uplink channel access with conventional LBT.

The terminal device determines the channel access type in the high-frequency band based on the channel access type in the non-high-frequency band determined according to the second correspondence, and the correspondence between the channel access type in the non-high-frequency band and the channel access type in the high-frequency band.

In other implementations, the indication manner of the channel access type and the CPE information in the second correspondence is reused.

For example, for the high-frequency band, when the bit field is mapped to the index 0, the target channel access type for the PUCCH transmission of the terminal device is the uplink channel access without LBT. When the bit field is mapped to the indexes 1 and 2, the target channel access type for the PUCCH transmission of the terminal device is the uplink channel access with short LBT. When the bit field is mapped to the index 3, the target channel access type for the PUCCH transmission of the terminal device is the uplink channel access with conventional LBT.

It should be understood that in the embodiments of the present disclosure, when a corresponding channel access type in the non-high-frequency band is determined according to the second correspondence, the index to which the bit field is mapped may be determined based on the above second bit field, for example, based on ChannelAccess-CPext information. When a corresponding channel access type in the high-frequency band is determined based on the second correspondence, the index to which the target bit field is mapped may be determined based on the above second bit field, or may be determined based on a newly added dedicated bit field.

Embodiment 3: DCI Format 0_1

Firstly, an implementation of a target bit field in DCI Format 0_1 is explained.

For the DCI Format 0_1, the target bit field may be a newly added bit field. That is, a dedicated bit field for indicating a target channel access type for PUSCH transmission in the high-frequency band is newly added.

For the DCI Format 0_1, the target bit field may reuse an existing bit field. For example, the third bit field in the DCI is reused to indicate the target channel access type for the PUSCH transmission in the high-frequency band.

For example, the third bit field indicates ChannelAccess-CPext-CAPC information.

In other words, the ChannelAccess-CPext-CAPC information in the DCI may be reused to indicate the target channel access type for the PUSCH transmission in the high-frequency band. For example, in the unlicensed high-frequency band, the ChannelAccess-CPext-CAPC information in the DCI is interpreted to indicate the target channel access type for the PUSCH transmission in the high-frequency band.

In some embodiments, the ChannelAccess-CPext-CAPC information may be 0-6 bits for the non-high-frequency band.

In some embodiments, for the high-frequency band, taking the uplink channel access without LBT, the uplink channel access with short LBT and the uplink channel access with conventional LBT being supported by the high-frequency band as an example, the bit width of the third bit field may be 2 bits.

In other embodiments, the bit width of the third bit field may be 0-2 bits for the high-frequency band. The specific bit width of the third bit field may be determined based on the higher layer parameter.

For example, the higher layer parameter may configure allowed entry indexes for DCI Format 0_1 in the high-frequency band. The entry index corresponds to the channel access type supported in the high-frequency band.

As an example, the higher layer parameter configures that entry indexes 0 and 2 are supported. In this case, the third bit field may be 1 bit.

As another example, the higher layer parameter configures that entry indexes 0, 1 and 2 are supported. In this case, the third bit field may be 2 bits.

Table 6 illustrates an example of a correspondence between an entry index configured by the higher layer parameter and a channel access type in the high-frequency band. As illustrated in Table 6, the higher layer parameter configures that the DCI Format 0_1 supports entry indexes 0, 1, and 2, and the entry indexes correspond to the corresponding channel access types, respectively.

TABLE 6

| Allowed entry indexes for DCI Format 0_1 in the high-frequency band | |
|---|---|
| Entry index | Channel access type |
| 0 | Uplink channel access without LBT |
| 1 | Uplink channel access with short LBT |
| 2 | Uplink channel access with conventional LBT |

Hereinafter, an implementation of the target correspondence in the DCI Format 0_1 will be explained.

It should be understood that without contradiction, the target correspondence may be combined with any above implementation of the target bit field, and the present disclosure is not limited thereto.

For the DCI Format 0_1, the target correspondence may be a newly added correspondence, such as a newly added table.

Table 7 illustrates an example of a correspondence between an index to which the target bit field is mapped and a channel access type in the high-frequency band.

Therefore, the network device may indicate the channel access mode for the PUSCH transmission to the terminal device through the DCI Format 0_1 and the correspondence illustrated in Table 7.

TABLE 7

| Channel access types for DCI Format 0_1 in the high-frequency band | |
|---|---|
| Index to which a target bit field is mapped | Channel access type |
| 0 | Uplink channel access without LBT |
| 1 | Uplink channel access with short LBT |
| 2 | Uplink channel access with conventional LBT |
| 3 | |

For the DCI Format 0_1, the target correspondence may reuse the third correspondence (for example, the above table 2). The third correspondence indicates the channel access type, CPE information and CAPC information corresponding to the index to which the bit field is mapped. In this case, the third correspondence indicates both the channel access type corresponding to the index to which the bit field is mapped in the non-high-frequency band and the channel access type corresponding to the index to which the target bit field is mapped in the high-frequency band.

In some implementations, the third correspondence is interpreted to indicate the channel access type corresponding to the index to which the target bit field is mapped in the high-frequency band.

For example, a correspondence between the channel access type in the non-high-frequency band and the channel access type in the high-frequency band in the third correspondence may be defined. For example, when the target bit field reuses an existing bit field, the channel access type in the high-frequency band is determined based on this manner. For example, in the high-frequency band, the uplink channel access with Type2C corresponds to the uplink channel access without LBT, the uplink channel access with Type2A and the uplink channel access with Type2B correspond to the uplink channel access with short LBT, and the uplink channel access with Type1 corresponds to the uplink channel access with conventional LBT. The terminal device determines the channel access type in the high-frequency band based on the channel access type in the non-high-frequency band determined according to the third correspondence and the correspondence between the channel access type in the non-high-frequency band and the channel access type in the high-frequency band.

In other implementations, the indication manner of the channel access type and the CPE information in the third correspondence (for example, table 2) is reused.

For example, for the high-frequency band, when the network device indicates the entry indexes 0-7 to the terminal device, it indicates that the PUSCH transmission of the terminal device corresponds to the uplink channel access without LBT. When the network device indicates the entry indexes 8-27 to the terminal device, it indicates that the PUSCH transmission of the terminal device corresponds to the uplink channel access with the short LBT. When the network device indicates entry indexes 28-43 to the terminal device, it indicates that the PUSCH transmission of the terminal device corresponds to the uplink channel access with the conventional LBT.

It should be understood that in the embodiments of the present disclosure, when a corresponding channel access type in the non-high-frequency band is determined according to the third correspondence, the index to which the bit field is mapped may be determined based on the above third bit field, for example, based on ChannelAccess-CPext-CAPC information. When the corresponding channel access type in the high-frequency band is determined according to the third correspondence, the index to which the target bit field is mapped may be determined based on the above third bit field, or may be determined based on the newly added dedicated bit field.

Embodiment 4: DCI Format 1_1

Firstly, an implementation of a target bit field in DCI Format 1_1 is explained.

For the DCI Format 1_1, the target bit field may be a newly added bit field. That is, a dedicated bit field for indicating a target channel access type for PUCCH transmission in the high-frequency band is newly added.

For the DCI Format 1_1, the target bit field may reuse an existing bit field. For example, the fourth bit field in the DCI is reused to indicate the target channel access type for the PUCCH transmission in the high-frequency band.

For example, the fourth bit field indicates ChannelAccess-CPext information.

In other words, the ChannelAccess-CPext information in the DCI may be reused to indicate the target channel access type for the PUCCH transmission in the high-frequency band. For example, in the unlicensed high-frequency band, the ChannelAccess-CPext information in the DCI is interpreted to indicate the target channel access type for the PUCCH transmission in the high-frequency band.

In some embodiments, the ChannelAccess-CPext information may be 0-4 bits for the non-high-frequency band.

In some embodiments, for the high-frequency band, taking the uplink channel access without LBT, the uplink channel access with short LBT and the uplink channel access with conventional LBT being supported by the high-frequency band as an example, the bit width of the fourth bit field may be 2 bits.

In other embodiments, the bit width of the fourth bit field may be 0-2 bits for the high-frequency band. The specific bit width of the fourth bit field may be determined based on the higher layer parameter.

For example, the higher layer parameter may configure an entry index allowed for the DCI Format 1_1 in the high-frequency band. The entry index indicates the channel access type supported in the high-frequency band.

As an example, the higher layer parameter configures that entry indexes 0 and 2 are supported. In this case, the fourth bit field may be 1 bit.

As another example, the higher layer parameter configures that entry indexes 0, 1, and 2 are supported. In this case, the fourth bit field may be 2 bits.

Table 8 illustrates an example of a correspondence between an entry index configured by the higher layer parameter and a channel access type in the high-frequency band. As illustrated in Table 8, the higher layer parameter configures that the DCI Format 1_1 supports entry indexes 0, 1, and 2, and the entry indexes correspond to the corresponding channel access types, respectively.

Therefore, the network device may indicate the channel access mode for the PUSCH transmission to the terminal device through the DCI Format 1_1 and the correspondence illustrated in Table 8.

TABLE 8

| Allowed entry indexes for DCI Format 1_1 in the high-frequency band | |
|---|---|
| Entry index | Channel access type |
| 0 | Uplink channel access without LBT |
| 1 | Uplink channel access with short LBT |
| 2 | Uplink channel access with conventional LBT |

Hereinafter, the implementation of the target correspondence in the DCI Format 1_1 will be explained.

It should be understood that without contradiction, the target correspondence may be combined with any above implementation of the target bit field, and the present disclosure is not limited thereto.

For the DCI Format 1_1, the target correspondence may be a newly added correspondence, such as a newly added table.

Table 9 illustrates an example of a correspondence between an index to which the target bit field is mapped and a channel access type in the high-frequency band.

Therefore, the network device may indicate the channel access mode for the PDSCH transmission to the terminal device through the DCI Format 1_1 and the correspondence illustrated in Table 9.

TABLE 9

| Channel access types for DCI Format 1_1 in the high-frequency band | |
|---|---|
| Index to which the bit field is mapped | Channel access type |
| 0 | Uplink channel access without LBT |
| 1 | Uplink channel access with short LBT |
| 2 | Uplink channel access with conventional LBT |
| 3 | |

For the DCI Format 1_1, the target correspondence may reuse the fourth correspondence (for example, the above table 3). The fourth correspondence indicates the channel access type and CPE information corresponding to the index to which the bit filed is mapped. In this case, the fourth correspondence indicates both the channel access type corresponding to the index to which the bit filed is mapped in the non-high-frequency band and the channel access type corresponding to the index to which the target bit field is mapped in the high-frequency band.

In other implementations, the fourth correspondence is interpreted to indicate the channel access type corresponding to the index to which the target bit field is mapped in the high-frequency band.

In some embodiments, a correspondence between the channel access type in the non-high-frequency band and the channel access type in the high-frequency band in the fourth correspondence may be defined. For example, when the target bit field reuses an existing bit field, the channel access type in the high-frequency band is determined based on this manner. For example, in the high-frequency band, the uplink channel access with Type2C corresponds to the uplink channel access without LBT, the uplink channel access with Type2A and the uplink channel access with Type2B correspond to the uplink channel access with short LBT, and the uplink channel access with Type1 corresponds to the uplink channel access with conventional LBT. The terminal device determines the channel access type in the high-frequency band based on the channel access type in the non-high-frequency band determined according to the fourth correspondence and the correspondence between the channel access type in the non-high-frequency band and the channel access type in the high-frequency band.

In other implementations, the indication manner of the channel access type and the CPE information in the fourth correspondence (for example, table 3) is reused.

For example, for the high-frequency band, when the network device indicates the entry indexes 0-1 to the terminal device, it indicates that the PUCCH transmission of the terminal device corresponds to the uplink channel access without LBT. When the network device indicates the entry indexes 2-6 to the terminal device, it indicates that the PUCCH transmission of the terminal device corresponds to the uplink channel access with the short LBT. When the network device indicates entry indexes 7-9 to the terminal device, it indicates that the PUCCH transmission of the terminal device corresponds to the uplink channel access with the conventional LBT.

It should be understood that in the embodiments of the present disclosure, when a corresponding channel access type in the non-high-frequency band is determined according to the fourth correspondence, the index to which the bit field is mapped may be determined based on the above fourth bit field, for example, based on ChannelAccess-CPext information. When the corresponding channel access type in the high-frequency band is determined according to the fourth correspondence, the index to which the target bit field is mapped may be determined based on the above fourth bit field, or may be determined based on a newly added dedicated bit field.

It should be understood that in the embodiment 4, the PUCCH transmission may be replaced by a Sounding Reference Signal (SRS) transmission.

It should be noted that the target correspondences corresponding to the DCI Format 0_0, DCI Format 1_0, DCI Format 0_1 and DCI Format 1_1 may be the same correspondence. For example, the table 4, the table 5, the table 6 and the table 8 may be the same table. In other words, the terminal device only needs to maintain one table for the four DCI formats. Alternatively, the target correspondences corresponding to the DCI Format 0_0, DCI Format 1_0, DCI Format 0_1 and DCI Format 1_1 may be different correspondences. For example, the table 4, the table 5, the table 6 and the table 8 are different tables. That is, the terminal device may maintain a respective table for each of the four DCI formats.

In other embodiments of the present disclosure, the DCI may implicitly indicate the target channel access type for the physical uplink channel transmission in the high-frequency band. For example, the resource location of the physical uplink channel scheduled in the DCI may be used to implicitly determine the target channel access mode for the physical uplink channel.

In some embodiments, when the format of the DCI is the DCI Format 2_0 and the DCI indicates that the channel access type corresponding to physical uplink channel transmission is the uplink channel access with the conventional LBT, the terminal device may determine a target channel access type for a to-be-transmitted physical uplink channel based on a resource position of a remaining channel occupancy of the network device and a resource position of the to-be-transmitted physical uplink channel.

For example, if the resource position of the to-be-transmitted physical uplink channel is within the resource position of the remaining channel occupancy of the network device, the terminal device may perform channel access using the resource position of the remaining channel occupancy of the network device. Therefore, the terminal device determines that the target access type for the physical uplink channel is the uplink channel access with the short LBT. That is, the uplink channel access with the conventional LBT indicated by the network device is switched to the uplink channel access with the short LBT.

It should be noted that in this embodiment, the network device initiates Channel Occupancy Time (COT) sharing. In this case, the network device may not only use resources in the COT for downlink transmission, but also share resources in the COT to the terminal device for uplink transmission.

Alternatively, the resource position of the remaining channel occupancy may refer to resources shared by the network device in the COT to the terminal device, or resources not used by the network device in the COT, or a remaining available COT. For example, it includes time domain position, frequency domain position and the like in the COT.

That is to say, if the terminal device determines that it is currently in the remaining channel occupancy of the network device through the DCI 2_0, and the uplink transmission of the terminal device also occurs in the time domain period and frequency domain position of the remaining channel occupancy, the terminal device may initiate the uplink transmission in the way of COT sharing. In this way, the terminal device may switch the uplink channel access with the conventional LBT to the uplink channel access with the short LBT, which is beneficial to improving the resource utilization rate and reducing the delay of uplink transmission.

In summary, in the embodiments of the present disclosure, the network device may indicate the target channel access type for the physical uplink channel transmission in the high-frequency band to the terminal device through the DCI format, and further, the terminal device may perform channel listening based on the target channel access type to transmit the physical uplink channel.

The method for wireless communication based on the embodiment of the present disclosure is described in detail above from the perspective of a terminal device with reference to FIG. 2, and the method for wireless communication based on another embodiment of the present disclosure is described in detail below from the perspective of a network device with reference to FIG. 3. It should be understood that the description on the network device side and the description on the terminal device side correspond to each other and similar descriptions may be referred to above, which will not be repeated here to avoid repetition.

Figure 3:
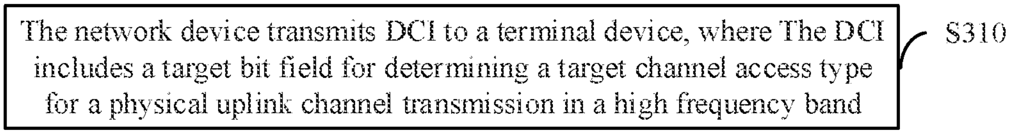
FIG. 3 is a schematic flowchart of another method for wireless communication provided by an embodiment of the present disclosure.

FIG. 3 is a schematic flowchart of a method 300 for wireless communication based on another embodiment of the present disclosure. The method 300 may be executed by a network device in the communication system illustrated in FIG. 1. As illustrated in FIG. 3, the method 300 includes the following operation.

In S310, the network device transmits DCI to a terminal device, where the DCI includes a target bit field for determining a target channel access type for a physical uplink channel transmission in a high-frequency band.

It should be understood that in the method 300, the specific implementation for the network device indicating the DCI to the terminal device may refer to the relevant description in the method 200, which will not be repeated here for the sake of brevity.

For example, the network device may determine a value of the target bit field based on the target channel access type that needs to be indicated, and further transmit the DCI to the terminal device.

In some embodiments of the present disclosure, a format of the DCI is one of the following formats: DCI Format 0_0, DCI Format 1_0, DCI Format 0_1, or DCI Format 1_1.

In some embodiments of the present disclosure, the target bit field is dedicated to indicating a channel access type in the high-frequency band.

In some embodiments of the present disclosure, the format of the DCI is the DCI Format 0_0, the target bit field is the first bit field in the DCI, and the first bit field indicates a channel access type and CPE information.

In some embodiments, in the high-frequency band, the first bit field is 2 bits.

In some embodiments of the present disclosure, the format of the DCI is the DCI Format 1_0, the target bit field is the second bit field in the DCI, and the second bit field indicates a channel access type and CPE information.

In some embodiments, in the high-frequency band, the second bit field is 2 bits.

In some embodiments of the present disclosure, the format of the DCI is the DCI Format 0_1, the target bit field is the third bit field in the DCI, and the third bit field indicates a channel access type, CPE information and CAPC information.

In some embodiments, in the high-frequency band, the third bit field is 2 bits.

In some embodiments of the present disclosure, the format of the DCI is the DCI Format 1_1, the target bit field is the fourth bit field in the DCI, and the fourth bit field indicates a channel access type and CPE information.

In some embodiments, in the high-frequency band, the fourth bit field is 2 bits.

In some embodiments of the present disclosure, the target channel access type for physical uplink channel transmission is determined based on the target bit field and a target correspondence. The target correspondence indicates a correspondence between an index to which the target bit field is mapped and a channel access type.

For example, the network device may determine a value of the target bit field based on the target channel access type that needs to be indicated and the target correspondence, and further transmit the DCI to the terminal device.

In some embodiments of the present disclosure, the target correspondence is dedicated to indicating a correspondence between the index to which the target bit field is mapped and a channel access type in the high-frequency band.

In some embodiments of the present disclosure, the format of the DCI is the DCI Format 0_0, and the target correspondence is the first correspondence. The first correspondence indicates a channel access type and CPE information corresponding to the index to which the target bit field is mapped, and the first correspondence further indicates a channel access type corresponding to the index to which the target bit field is mapped in the high-frequency band.

In some embodiments of the present disclosure, the format of the DCI is the DCI Format 1_0, and the target correspondence is the second correspondence. The second correspondence indicates a channel access type and CPE information corresponding to the index to which the target bit field is mapped, and the second correspondence further indicates a channel access type corresponding to the index to which the target bit field is mapped in the high-frequency band.

In some embodiments of the present disclosure, the format of the DCI is the DCI Format 0_1, and the target correspondence is the third correspondence. The third correspondence indicates a channel access type, CPE information and CAPC information corresponding to the index to which the target bit field is mapped, and the third correspondence further indicates a channel access type corresponding to the index to which the target bit field is mapped in the high-frequency band.

In some embodiments of the present disclosure, the format of the DCI is the DCI Format 1_1, and the target correspondence is the fourth correspondence. The fourth correspondence indicates a channel access type and CPE information corresponding to the index to which the target bit field is mapped, and the fourth correspondence further indicates a channel access type corresponding to the index to which the target bit field is mapped in the high-frequency band.

In summary, in the embodiment of the present disclosure, the network device may indicate the channel access type corresponding to the physical uplink channel transmission in the high-frequency band to the terminal device through the DCI format, for example, the channel access type for the physical uplink channel transmission in the high-frequency band is indicated to the terminal device based on the DCI format and the above target correspondence. Accordingly, the terminal device may determine, based on the DCI format and the target correspondence, the channel access type indicated by the network device, and further the terminal device may perform channel listening based on the target channel access type to transmit the physical uplink channel.

The method embodiments of the present disclosure have been described in detail above with reference to FIG. 2 to FIG. 3, and the apparatus embodiments of the present disclosure have been described in detail below with reference to FIG. 4 to FIG. 7. It should be understood that the apparatus embodiments and the method embodiments correspond to each other, and similar descriptions may refer to the method embodiments.

Figure 4:
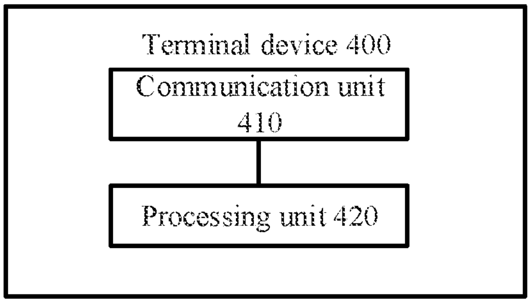
FIG. 4 is a schematic block diagram of a terminal device provided by an embodiment of the present disclosure.

FIG. 4 illustrates a schematic block diagram of a terminal device 400 based on an embodiment of the present disclosure. As illustrated in FIG. 4, the terminal device 400 includes a communication unit 410 and a processing unit 420.

The communication unit 410 is configured to receive DCI transmitted by a network device.

The processing unit 420 is configured to determine, based on a format of the DCI, a target channel access type for physical uplink channel transmission in a high-frequency band among multiple channel access types.

The multiple channel access types include at least one of: uplink channel access without LBT, uplink channel access with short LBT, or uplink channel access with conventional LBT.

In some embodiments of the present disclosure, the processing unit 420 is further configured to: when the format of the DCI is a target DCI format, determine, based on a target bit field in the DCI, the target channel access type for the physical uplink channel transmission in the high-frequency band among the multiple channel access types. The target bit field indicates a channel access type for transmitting a physical uplink channel.

The target DCI format includes at least one of: DCI Format 0_0, DCI Format 1_0, DCI Format 0_1, or DCI Format 1_1.

In some embodiments of the present disclosure, the target bit field is dedicated to indicating a channel access type in the high-frequency band.

In some embodiments of the present disclosure, the format of the DCI is the DCI Format 0_0, the target bit field is the first bit field in the DCI, and the first bit field indicates a channel access type and CPE information.

In some embodiments, in the high-frequency band, the first bit field is 2 bits.

In some embodiments, the format of the DCI is the DCI Format 1_0, the target bit field is the second bit field in the DCI, and the second bit field indicates a channel access type and CPE information.

In some embodiments, in the high-frequency band, the second bit field is 2 bits.

In some embodiments of the present disclosure, the format of the DCI is the DCI Format 0_1, the target bit field is the third bit field in the DCI, and the third bit field indicates a channel access type, CPE information and CAPC information.

In some embodiments, in the high-frequency band, the third bit field is 2 bits.

In some embodiments of the present disclosure, the format of the DCI is the DCI Format 1_1, the target bit field is the fourth bit field in the DCI, and the fourth bit field indicates a channel access type and CPE information.

In some embodiments, in the high-frequency band, the fourth bit field is 2 bits.

In some embodiments of the present disclosure, the processing unit 420 is further configured to determine, based on the target bit field in the DCI and a target correspondence, the target channel access type for the physical uplink channel transmission in the high-frequency band among the multiple channel access types. The target correspondence indicates a correspondence between an index to which the target bit field is mapped and a channel access type.

In some embodiments of the present disclosure, the target correspondence is dedicated to indicating a correspondence between the index to which the target bit field is mapped and a channel access type in the high-frequency band.

In some embodiments of the present disclosure, the format of the DCI is the DCI Format 0_0, and the target correspondence is the first correspondence. The first correspondence indicates a channel access type and CPE information corresponding to the index to which the target bit field is mapped, and the first correspondence further indicates a channel access type corresponding to the index to which the target bit field is mapped in the high-frequency band.

In some embodiments of the present disclosure, the format of the DCI is the DCI Format 1_0, and the target correspondence is the second correspondence. The second correspondence indicates a channel access type and CPE information corresponding to the index to which the target bit field is mapped, and the second correspondence further indicates a channel access type corresponding to the index to which the target bit field is mapped in the high-frequency band.

In some embodiments of the present disclosure, the format of the DCI is the DCI Format 0_1, and the target correspondence is the third correspondence. The third correspondence indicates a channel access type, CPE information and CAPC information corresponding to the index to which the target bit field is mapped, and the third correspondence further indicates a channel access type corresponding to the index to which target bit field is mapped in the high-frequency band.

In some embodiments of the present disclosure, the format of the DCI is the DCI Format 1_1, and the target correspondence is the fourth correspondence. The fourth correspondence indicates a channel access type and CPE information corresponding to the index to which the target bit field is mapped, and the fourth correspondence further indicates a channel access type corresponding to the index to which the target bit field is mapped in the high-frequency band.

In some embodiments of the present disclosure, the processing unit 420 is further configured to: when the format of the DCI is DCI Format 2_0 and the DCI indicates that a channel access type corresponding to the physical uplink channel transmission is an uplink channel access with a conventional LBT, determine a target channel access type for a to-be-transmitted physical uplink channel based on a resource position of a remaining channel occupancy of the network device and a resource position of the to-be-transmitted physical uplink channel.

In some embodiments of the present disclosure, the processing unit 420 is further configured to: if the resource position of the to-be-transmitted physical uplink channel is within the resource position of the remaining channel occupancy of the network device, determine that the target access type for the to-be-transmitted physical uplink channel is an uplink channel access with short LBT.

Alternatively, in some embodiments, the above communication unit may be a communication interface, a transceiver, an input-output interface of a communication chip or a system-on-chip. The processing unit may be one or more processors.

It should be understood that the terminal device 400 based on the embodiment of the present disclosure may correspond to the terminal device in the method embodiments of the present disclosure, and the above and other operations and/or functions of the various units in the terminal device 400 are used for implementing the corresponding flows of the terminal device in the method 200 illustrated in FIG. 2, which are not repeated here for the sake of brevity.

Figure 5:
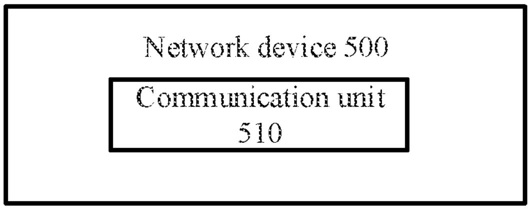
FIG. 5 is a schematic block diagram of a network device provided by an embodiment of the present disclosure.

FIG. 5 is a schematic block diagram of a network device based on an embodiment of the present disclosure. The network device 500 illustrated in the FIG. 5 includes a communication unit 510.

The communication unit 510 is configured to transmit DCI to a terminal device. The DCI includes a target bit field for determining a target channel access type for physical uplink channel transmission in a high-frequency band.

In some embodiments of the present disclosure, a format of the DCI is one of the following: DCI Format 0_0, DCI Format 1_0, DCI Format 0_1, or DCI Format 1_1.

In some embodiments of the present disclosure, the target bit field is dedicated to indicating a channel access type in the high-frequency band.

In some embodiments of the present disclosure, the format of the DCI is the DCI Format 0_0, the target bit field is the first bit field in the DCI, and the first bit field indicates a channel access type and CPE information.

In some embodiments, in the high-frequency band, the first bit field is 2 bits.

In some embodiments of the present disclosure, the format of the DCI is the DCI Format 1_0, the target bit field is the second bit field in the DCI, and the second bit field indicates a channel access type and CPE information.

In some embodiments, in the high-frequency band, the second bit field is 2 bits.

In some embodiments of the present disclosure, the format of the DCI is the DCI Format 0_1, the target bit field is the third bit field in the DCI, and the third bit field indicates a channel access type, CPE information and CAPC information.

In some embodiments, in the high-frequency band, the third bit field is 2 bits.

In some embodiments of the present disclosure, the format of the DCI is the DCI Format 1_1, the target bit field is the fourth bit field in the DCI, and the fourth bit field indicates a channel access type and CPE information.

In some embodiments, in the high-frequency band, the third bit field is 2 bits.

In some embodiments of the present disclosure, the target channel access type for the physical uplink channel transmission is determined based on the target bit field and a target correspondence, and the target correspondence indicates a correspondence between an index to which the target bit field is mapped and a channel access type.

In some embodiments of the present disclosure, the target correspondence is dedicated to indicating a correspondence between the index to which the target bit field is mapped and a channel access type in the high-frequency band.

In some embodiments of the present disclosure, the format of the DCI is the DCI Format 0_0, and the target correspondence is the first correspondence. The first correspondence indicates a channel access type and CPE information corresponding to the index to which the target bit field is mapped, and the first correspondence further indicates a channel access type corresponding to the index to which the target bit field is mapped in the high-frequency band.

In some embodiments of the present disclosure, the format of the DCI is the DCI Format 1_0, and the target correspondence is the second correspondence. The second correspondence indicates a channel access type and CPE information corresponding to the index to which the target bit field is mapped, and the second correspondence further indicates a channel access type corresponding to the index to which the target bit field is mapped in the high-frequency band.

In some embodiments of the present disclosure, the format of the DCI is the DCI Format 0_1, and the target correspondence is the third correspondence. The third correspondence indicates a channel access type, CPE information and CAPC information corresponding to the index to which the target bit field is mapped, and the third correspondence further indicates a channel access type corresponding to the index to which the target bit field is mapped in the high-frequency band.

In some embodiments of the present disclosure, the format of the DCI is the DCI Format 1_1, and the target correspondence is the fourth correspondence. The fourth correspondence indicates a channel access type and CPE information corresponding to the index to which the target bit field is mapped, and the fourth correspondence further indicates a channel access type corresponding to the index to which the target bit field is mapped in the high-frequency band.

Alternatively, in some embodiments, the above communication unit may be a communication interface, a transceiver or an input-output interface of a communication chip or a system-on-chip. The processing unit may be one or more processors.

It should be understood that the network device 500 based on the embodiment of the present disclosure may correspond to the network device in the method embodiments of the present disclosure, and the above and other operations and/or functions of the various units in the network device 500 are used for implementing the corresponding flows of the network device in the method 300 illustrated in FIG. 3, which are not repeated here for the sake of brevity.

Figure 6:
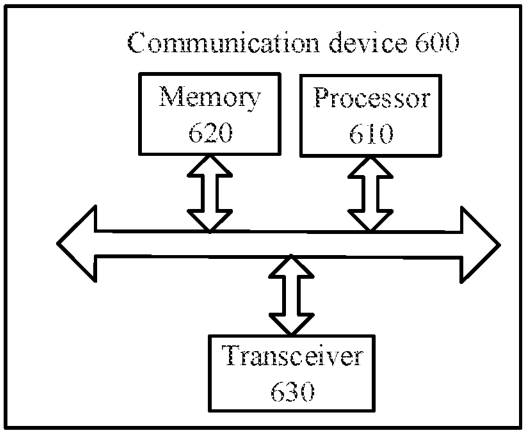
FIG. 6 is a schematic block diagram of a communication device provided by an embodiment of the present disclosure.

FIG. 6 is a schematic structural diagram of a communication device 600 provided by an embodiment of the present disclosure. The communication device 600 illustrated in FIG. 6 includes a processor 610. The processor 610 may invoke and run a computer program from a memory to perform the method in the embodiments of the present disclosure.

Alternatively, as illustrated in FIG. 6, the communication device 600 may further include a memory 620. The processor 610 may invoke and run a computer program from the memory 620 to perform the methods in the embodiments of the present disclosure.

The memory 620 may be a separate device independent of the processor 610 or may be integrated in the processor 610.

Alternatively, as illustrated in FIG. 6, the communication device 600 may further include a transceiver 630. The processor 610 may control the transceiver 630 to communicate with other devices, and in particular, may transmit information or data to the other devices, or receive information or data transmitted by the other devices.

The transceiver 630 may include a transmitter and a receiver. The transceiver 630 may further include one or more antennas.

Alternatively, the communication device 600 may be specifically a network device in the embodiments of the present disclosure, and the communication device 600 may implement corresponding processes implemented by the network device in various methods of the embodiments of the present disclosure, which will not be repeated here for the sake of brevity.

Alternatively, the communication device 600 may be specifically a mobile terminal/terminal device in the embodiments of the present disclosure, and the communication device 600 may implement corresponding processes implemented by the mobile terminal/terminal device in various methods of the embodiments of the present disclosure, which will not be repeated here for the sake of brevity.

Figure 7:
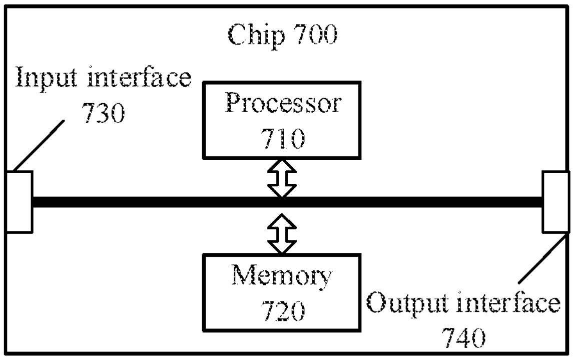
FIG. 7 is a schematic block diagram of a chip provided by an embodiment of the present disclosure.

FIG. 7 is a schematic structural diagram of a chip based on an embodiment of the present disclosure. The chip 700 illustrated in FIG. 7 includes a processor 710. The processor 710 may invoke and run a computer program from a memory to perform the methods in the embodiments of the present disclosure.

Alternatively, as illustrated in FIG. 7, the chip 700 may further include a memory 720. The processor 710 may invoke and run a computer program from the memory 720 to perform the methods in the embodiments of the present disclosure.

The memory 720 may be a separate device independent of the processor 710 or may be integrated in the processor 710.

Alternatively, the chip 700 may further include an input interface 730. The processor 710 may control the input interface 730 to communicate with other devices or chips, and in particular, may obtain information or data transmitted by the other devices or chips.

Alternatively, the chip 700 may further include an output interface 740. The processor 710 may control the output interface 740 to communicate with other devices or chips, and in particular, may output information or data to the other devices or chips.

Alternatively, the chip may be applied to the network device in the embodiments of the present disclosure, and the chip may implement the corresponding processes implemented by the network device in various methods of the embodiments of the present disclosure, which will not be repeated here for the sake of brevity.

Alternatively, the chip may be applied to the mobile terminal/terminal device in the embodiments of the present disclosure, and the chip may implement the corresponding processes implemented by the mobile terminal/terminal device in various methods of the embodiments of the present disclosure, which will not be repeated here for the sake of brevity.

It should be understood that the chip referred to in the embodiment of the present disclosure may also be referred to as a system level chip, a system chip, a chip system or a system-on-chip or the like.

Figure 8:
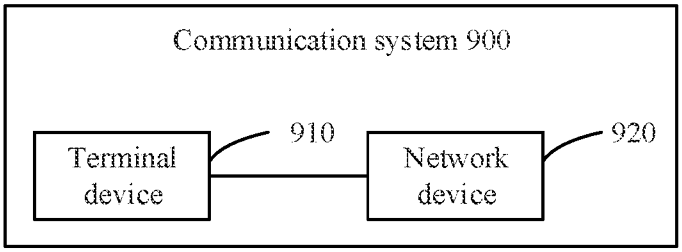
FIG. 8 is a schematic block diagram of a communication system provided by an embodiment of the present disclosure.

FIG. 8 is a schematic block diagram of a communication system 900 provided by an embodiment of the present disclosure. As illustrated in FIG. 8, the communication system 900 includes a terminal device 910 and a network device 920.

The terminal device 910 may be used to implement the corresponding functions implemented by the terminal device in the above methods, and the network device 920 may be used to implement the corresponding functions implemented by the network device in the above methods, which will not be repeated here for the sake of brevity.

It should be understood that the processor in the embodiments of the present disclosure may be an integrated circuit chip having signal processing capability. In implementation, the operations of the above method embodiments may be accomplished by integrated logic circuitry of hardware in the processor or instructions in the form of software. The above processor may be a general purpose processor, a Digital Signal Processor (DSP), an Application Specific Integrated Circuit (ASIC), a Field Programmable Gate Array (FPGA), other programmable logic devices, discrete gates, transistor logic devices, or discrete hardware components. The methods, operations and logic block diagrams disclosed in the embodiments of the present disclosure may be implemented or performed. The general purpose processor may be a microprocessor or the processor may be any conventional processor or the like. The operations of the methods disclosed in combination with the embodiments of the present disclosure may be directly embodied as the execution of the hardware decoding processor or the combined execution of the hardware and software modules in the decoding processor. The software module may be located in a Random Access Memory (RAM), a flash memory, a Read-Only Memory (ROM), a Programmable ROM (PROM), an electrically erasable PROM (EEPROM), a register and other storage medium mature in the art. The storage medium is located in the memory, and the processor reads the information in the memory and completes the operations of the methods in combination with its hardware.

It is understood that the memory in embodiments of the present disclosure may be a volatile memory or a nonvolatile memory or may include both volatile and nonvolatile memory. The nonvolatile memory may be a ROM, a PROM, an Erasable PROM (EPROM), an EEPROM, or a flash memory. The volatile memory may be a RAM which serves as an external cache. By way of illustration, but not limitation, many forms of RAM are available, such as a static RAM (SRAM), a Dynamic RAM (DRAM), a Synchronous DRAM (SDRAM), Double Data Rate SDRAM (DDR SDRAM), an Enhanced SDRAM (ESDRAM), an Synchlink DRAM (SLDRAM), and a Direct Rambus RAM (DR RAM). It should be noted that the memory of the systems and methods described herein is intended to include but not limited to these and any other suitable types of memory.

It should be understood that the above memory is exemplary, but not limiting, and, for example, the memory in embodiments of the present disclosure may also be an SRAM, a DRAM, an SDRAM, a DDR SDRAM, an ESDRAM, an SLDRAM, a DR RAM, etc. That is, the memory in embodiments of the present disclosure is intended to include but not limited to these and any other suitable types of memory.

The embodiments of the present disclosure further provide a computer readable storage medium for storing computer programs.

Alternatively, the computer readable storage medium may be applied to the network device in the embodiments of the present disclosure, and the computer programs cause the computer to execute the corresponding flows implemented by the network device in the various methods of the embodiments of the present disclosure, which will not be repeated here for the sake of brevity.

Alternatively, the computer readable storage medium may be applied to the mobile terminal/terminal device in the embodiments of the present disclosure, and the computer programs cause the computer to execute corresponding flows implemented by the mobile terminal/terminal device in the various methods of the embodiments of the present disclosure, which will not be repeated here for the sake of brevity.

The embodiments of the present disclosure further provide a computer program product, including computer program instructions.

Alternatively, the computer program product may be applied to the network device in the embodiments of the present disclosure, and the computer program instructions cause the computer to execute the corresponding flows implemented by the network device in the various methods of the embodiments of the present disclosure, which will not be repeated here for the sake of brevity.

Alternatively, the computer program product may be applied to the mobile terminal/terminal device in the embodiments of the present disclosure, and the computer program instructions cause the computer to execute corresponding flows implemented by the terminal device in the various methods of the embodiments of the present disclosure, which will not be repeated here for the sake of brevity.

The embodiments of the present disclosure further provide a computer program.

Alternatively, the computer program may be applied to the network device in the embodiments of the present disclosure and, when the computer program is run on the computer, causes the computer to execute the corresponding flows implemented by the network device in the various methods of the embodiments of the present disclosure, which will not be repeated here for the sake of brevity.

In some embodiments, the computer program may be applied to the mobile terminal/terminal device in the embodiments of the present disclosure and, when the computer program is run on the computer, causes the computer to execute the corresponding flows implemented by the mobile terminal/terminal device in the various methods of the embodiments of the present disclosure, which will not be repeated here for the sake of brevity.

Those of ordinary skill in the art will appreciate that the various example units and algorithm steps described in combination with the embodiments disclosed herein may be implemented in electronic hardware or a combination of computer software and electronic hardware. Whether these functions are performed in hardware or software depends on the specific application and design constraints of the technical solutions. Skilled artisans may use different methods for each particular application to implement the described functionality, but such implementation should not be considered outside the scope of the present disclosure.

Those skilled in the art will clearly appreciate that, for convenience and conciseness of description, the specific operating processes of the above described systems, apparatuses and units may refer to the corresponding processes in the aforementioned method embodiments, which will not be repeated here for the sake of brevity.

In several embodiments provided herein, it should be understood that the disclosed systems, apparatuses and methods may be implemented in other ways. For example, the above embodiments of the apparatuses are only schematic, for example, the division of the units is only a logical function division, and in practice, there may be another division mode, for example, multiple units or components may be combined or integrated into another system, or some features may be ignored or not performed. On the other hand, the coupling, direct coupling or communication connection between each other shown or discussed may be indirect coupling or communication connection through some interfaces, apparatus or units, and may be electrical, mechanical or other form.

The units illustrated as separate components may or may not be physically separated, and the components displayed as units may or may not be physical units, i.e. may be located in one place, or may be distributed over multiple network units. Part or all of the units may be selected according to the actual needs to achieve the purpose of the embodiments.

In addition, various functional units in each embodiment of the present disclosure may be integrated in one processing unit, each unit may exist physically alone, or two or more units may be integrated in one unit.

The functions may be stored in a computer readable storage medium if implemented in the form of software functional units and sold or used as stand-alone products. With this understanding, the technical solution of the present disclosure in essence or in part contributing to the prior art may be embodied in the form of a software product. The computer software product is stored in a storage medium, which including instructions for causing a computer device (which may be a personal computer, a server, a network device, etc.) to perform all or part of the steps of the methods described in various embodiments of the present disclosure. The above storage medium includes a U disk, a removable hard disk, a ROM, a RAM, a magnetic disk or an optical disk and other medium capable of storing program codes.

The above-mentioned is only the specific embodiments of the present disclosure, but the scope of protection of the present disclosure is not limited thereto. Any technical person familiar with the technical field can easily think of changes or substitutions within the technical scope disclosed in the present disclosure, which should be covered within the scope of protection of the present disclosure. Therefore, the scope of protection of the present disclosure shall be subject to the scope of protection of the claims.

What is claimed is:

1. A method for wireless communication, comprising:

receiving, by a terminal device, downlink control information (DCI) transmitted by a network device; and determining, by the terminal device based on a format of the DCI, a target channel access type for physical uplink channel transmission in a high-frequency band among a plurality of channel access types, wherein the plurality of channel access types comprise at least one of:

uplink channel access without Listen Before Talk (LBT);

uplink channel access with Cat 2 LBT; or uplink channel access with Cat 4 LBT, wherein determining, by the terminal device based on the format of the DCI, the target channel access type for the physical uplink channel transmission in the high-frequency band among the plurality of channel access types comprises:

when the format of the DCI is a target DCI format, determining, based on a target bit field in the DCI, the target channel access type for the physical uplink channel transmission in the high-frequency band among the plurality of channel access types, wherein the target bit field indicates a channel access type for the physical uplink channel transmission, wherein the target DCI format comprises at least one of: DCI Format 0_0, DCI Format 1_0, DCI Format 0_1, or DCI Format 1_1.

2. The method of claim 1, wherein one of the following applies:

the format of the DCI is the DCI Format 0_0, the target bit field is a first bit field in the DCI, and the first bit field indicates a channel access type and cyclic prefix extension (CPE) information;

the format of the DCI is the DCI Format 1_0, the target bit field is a second bit field in the DCI, and the second bit field indicates a channel access type and CPE information;

the format of the DCI is the DCI Format 0_1, the target bit field is a third bit field in the DCI, and the third bit field indicates a channel access type, CPE information and channel access priority class (CAPC) information; or the format of the DCI is the DCI Format 1_1, the target bit field is a fourth bit field in the DCI, and the fourth bit field indicates a channel access type and CPE information.

3. The method of claim 2, wherein in the high-frequency band, each of the first bit filed, the second bit field, the third bit filed and the fourth bit field comprises 2 bits.

4. The method of claim 1, wherein determining, based on the target bit field in the DCI, the target channel access type for the physical uplink channel transmission in the high-frequency band among the plurality of channel access types comprises:

determining, based on the target bit field in the DCI and a target correspondence, the target channel access type for the physical uplink channel transmission in the high-frequency band among the plurality of channel access types, wherein the target correspondence indicates a correspondence between an index to which the target bit field is mapped and a channel access type.

5. The method of claim 4, wherein the format of the DCI is the DCI Format 0_0, the target correspondence is a first correspondence, the first correspondence indicates a channel access type and CPE information corresponding to the index to which the target bit field is mapped, and the first correspondence further indicates a channel access type corresponding to the index to which the target bit field is mapped in the high-frequency band.

6. The method of claim 4, wherein the format of the DCI is the DCI Format 1_0, the target correspondence is a second correspondence, the second correspondence indicates a channel access type and CPE information corresponding to the index to which the target bit field is mapped, and the second correspondence further indicates a channel access type corresponding to the index to which the target bit field is mapped in the high-frequency band.

7. The method of claim 4, wherein the format of the DCI is the DCI Format 0_1, the target correspondence is a third correspondence, the third correspondence indicates a channel access type, CPE information and CAPC information corresponding to the index to which the target bit field is mapped, and the third correspondence further indicates a channel access type corresponding to the index to which the target bit field is mapped in the high-frequency band.

8. The method of claim 4, wherein the format of the DCI is the DCI Format 1_1, the target correspondence is a fourth correspondence, the fourth correspondence indicates a channel access type and CPE information corresponding to the index to which the target bit field is mapped, and the fourth correspondence further indicates a channel access type corresponding to the index to which the target bit field is mapped in the high-frequency band.

9. A terminal device, comprising:

a transceiver, configured to receive downlink control information (DCI) transmitted by a network device; and a processor, configured to determine, based on a format of the DCI, a target channel access type for physical uplink channel transmission in a high-frequency band among a plurality of channel access types, wherein the plurality of channel access types comprise at least one of:

uplink channel access without Listen Before Talk (LBT);

uplink channel access with short LBT; or uplink channel access with conventional LBT, wherein the processor is further configured to:

when the format of the DCI is a target DCI format, determine, based on a target bit field in the DCI, the target channel access type for the physical uplink channel transmission in the high-frequency band among the plurality of channel access types, wherein the target bit field indicates a channel access type for the physical uplink channel transmission, wherein the target DCI format comprises at least one of: DCI Format 0_0, DCI Format 1_0, DCI Format 0_1, or DCI Format 1_1.

10. The terminal device of claim 9, wherein at least one of the following applies:

the format of the DCI is the DCI Format 0_0, the target bit field is a first bit field in the DCI, and the first bit field indicates a channel access type and cyclic prefix extension (CPE) information;

the format of the DCI is the DCI Format 1_0, the target bit field is a second bit field in the DCI, and the second bit field indicates a channel access type and CPE information;

wherein the format of the DCI is the DCI Format 0_1, the target bit field is a third bit field in the DCI, and the third bit field indicates a channel access type, CPE information and channel access priority class (CAPC) information; or the format of the DCI is the DCI Format 1_1, the target bit field is a fourth bit field in the DCI, and the fourth bit field indicates a channel access type and CPE information.

11. The terminal device of claim 10, wherein in the high-frequency band, each of the first bit filed, the second bit field, the third bit filed and the fourth bit field comprises 2 bits.

12. The terminal device of claim 9, wherein the processing unit is further configured to:

determine, based on the target bit field in the DCI and a target correspondence, the target channel access type for the physical uplink channel transmission in the high-frequency band among the plurality of channel access types, wherein the target correspondence indicates a correspondence between an index to which the target bit field is mapped and a channel access type.

13. The terminal device of claim 12, wherein the format of the DCI is the DCI Format 0_0, the target correspondence is a first correspondence, the first correspondence indicates a channel access type and CPE information corresponding to the index to which the target bit field is mapped, and the first correspondence further indicates a channel access type corresponding to the index to which the target bit field is mapped in the high-frequency band.

14. The terminal device of claim 12, wherein the format of the DCI is the DCI Format 1_0, the target correspondence is a second correspondence, the second correspondence indicates a channel access type and CPE information corresponding to the index to which the target bit field is mapped, and the second correspondence further indicates a channel access type corresponding to the index to which the target bit field is mapped in the high-frequency band.

15. The terminal device of claim 12, wherein the format of the DCI is the DCI Format 0_1, the target correspondence is a third correspondence, the third correspondence indicates a channel access type, CPE information and CAPC information corresponding to the index to which the target bit field is mapped, and the third correspondence further indicates a channel access type corresponding to the index to which the target bit field is mapped in the high-frequency band.

16. The terminal device of claim 12, wherein the format of the DCI is the DCI Format 1_1, the target correspondence is a fourth correspondence, the fourth correspondence indicates a channel access type and CPE information corresponding to the index to which the target bit field is mapped, and the fourth correspondence further indicates a channel access type corresponding to the index to which the target bit field is mapped in the high-frequency band.

17. A network device, comprising:

a processor; and a memory configured to store a computer program, wherein the processor is configured to invoke and run the computer program stored in the memory to perform operations comprising:

transmitting downlink control information (DCI) to a terminal device, wherein when a format of the DCI is a target DCI format, a target bit field in the DCI is used for determining a target channel access type for physical uplink channel transmission in a high-frequency band among the plurality of channel access types, the target bit field indicating a channel access type for the physical uplink channel transmission, wherein the target DCI format comprises at least one of the following: DCI Format 0_0, DCI Format 1_0, DCI Format 0_1, or DCI Format 1_1; and wherein the plurality of channel access types comprise at least one of:

uplink channel access without Listen Before Talk (LBT);

uplink channel access with Cat 2 LBT; or uplink channel access with Cat 4 LBT.

* * * * *